US011268619B2

(12) United States Patent
Crichton

(10) Patent No.: US 11,268,619 B2
(45) Date of Patent: Mar. 8, 2022

(54) SEALING ARRANGEMENT

(71) Applicant: APEX VALVES LIMITED, Auckland (NZ)

(72) Inventor: David Gordon Arthur Crichton, Waitoki (NZ)

(73) Assignee: APEX VALVES LIMITED, Auckland (NZ)

( * ) Notice: Subject to any disclaimer, the term of this patent is extended or adjusted under 35 U.S.C. 154(b) by 16 days.

(21) Appl. No.: 16/646,308

(22) PCT Filed: Feb. 22, 2019

(86) PCT No.: PCT/NZ2019/050015
§ 371 (c)(1),
(2) Date: Mar. 11, 2020

(87) PCT Pub. No.: WO2019/168413
PCT Pub. Date: Sep. 6, 2019

(65) Prior Publication Data
US 2020/0284354 A1   Sep. 10, 2020

(30) Foreign Application Priority Data
Feb. 27, 2018  (NZ) ...................................... 740296

(51) Int. Cl.
*F16K 1/36* (2006.01)
*F16K 1/46* (2006.01)
(Continued)

(52) U.S. Cl.
CPC .................. *F16K 1/36* (2013.01); *F16K 1/46* (2013.01); *F16K 21/18* (2013.01); *F16K 31/26* (2013.01);
(Continued)

(58) Field of Classification Search
CPC ... F16K 1/126; F16K 1/36; F16K 1/46; F16K 3/246; F16K 31/26; F16K 31/30;
(Continued)

(56) References Cited

U.S. PATENT DOCUMENTS 3,504,884 A * 4/1970 Jacobus .................. F16K 3/243
251/172
4,819,952 A * 4/1989 Edlund ................ F16J 15/3208
277/550

(Continued)

FOREIGN PATENT DOCUMENTS

NZ            585246 A      4/2012

OTHER PUBLICATIONS

International Search Report issued in PCT/NZ2019/050015; dated Apr. 15, 2019.

*Primary Examiner* — Hailey K. Do
(74) *Attorney, Agent, or Firm* — Studebaker & Brackett PC

(57) ABSTRACT

A liquid control valve including a body comprising an inlet port, an outlet port, and an interior chamber, the body defining a liquid passageway between the inlet and outlet ports. Also included is a plunger comprising a groove provided on an external wall, the plunger being configured to reciprocate within the interior chamber of the body between a first position where the valve is closed and a second position where the valve is open. Also provided is a sealing arrangement within the groove configured to seal between the plunger and the interior chamber of the body. The sealing arrangement includes a first sealing element on the external wall of the plunger and spaced apart from an inner wall of the internal chamber, and a second sealing element on the inner wall of the internal chamber and spaced apart from the external wall of the plunger.

15 Claims, 4 Drawing Sheets

(51) Int. Cl.
    *F16K 31/26*   (2006.01)
    *F16J 15/00*   (2006.01)
    *F16K 21/18*   (2006.01)
    *F16J 9/20*    (2006.01)
    *F16J 15/32*   (2016.01)
    *F16K 1/12*    (2006.01)

(52) U.S. Cl.
    CPC ............... *F16J 9/20* (2013.01); *F16J 15/002* (2013.01); *F16J 15/32* (2013.01); *F16K 1/126* (2013.01)

(58) Field of Classification Search
    CPC ......... F16K 11/0712; F16K 21/18; F16J 9/16; F16J 9/20; F16J 15/002; F16J 15/164; F16J 15/3204; F16J 15/3232; F16J 15/3296
    See application file for complete search history.

(56) References Cited

U.S. PATENT DOCUMENTS

| | | | |
|---|---|---|---|
| 4,892,287 A * | 1/1990 | Weevers | F16J 15/32 251/172 |
| 4,978,102 A | 12/1990 | Schuchart et al. | |
| 5,732,727 A | 3/1998 | Mieth et al. | |
| 2002/0017327 A1 | 2/2002 | Kawaai et al. | |
| 2014/0174566 A1* | 6/2014 | Crichton | F16K 15/142 137/511 |
| 2016/0341318 A1* | 11/2016 | Hervieux | F15B 15/1452 |
| 2017/0130863 A1 | 5/2017 | Chang | |

* cited by examiner

SEALING ARRANGEMENT

FIELD OF THE INVENTION

The present invention relates to a liquid control valves and in particular to a sealing arrangement for a liquid control valve.

BACKGROUND OF THE INVENTION

There are known liquid control valves such as float valves suitable for use with animal watering troughs and similar watering retaining vessels. Typically, such valves incorporate a sealing element, such as an O-ring, between a piston and a valve body. Friction is an issue that adversely affects the operation of a liquid control valve. Friction between the plunger and the body can prevent the valve from opening fully as the water level in a trough drops. The problem may be more severe if the float is not screwed directly to the end of the arm but instead attached by a cord as there is less weight available to open the valve.

Also, a noise problem can arise with valves controlling liquid under pressure such as a float valve controlling a mains pressure water supply to a reservoir, tank or similar. In some cases, the closing can cause water hammer and/or vibrations being set up causing undesirable noise as the valve closes.

It is therefore an object of the invention to provide a liquid control valve having a sealing arrangement which overcomes or ameliorates at least one disadvantage of the prior art, or at least provide the public with an useful choice.

Further objects of the invention will become apparent from the following description.

DISCLOSURE OF THE INVENTION

According to one broad aspect of the invention there is provided a liquid control valve for use in controlling a liquid supply to a reservoir, the liquid control valve including: a body comprising an inlet port, an outlet port, and an interior chamber, the body defining a liquid passageway between the inlet and outlet ports; a plunger comprising a groove provided on an external wall, the plunger being configured to reciprocally move, in use, within the interior chamber of the body between a first position where the liquid control valve is closed such that the liquid is prevented to flow from the inlet to the outlet port and a second position where the liquid control valve is open such that the liquid can flow from the inlet to the outlet; and a sealing arrangement disposed within the groove configured to seal between the plunger and the interior chamber of the body; wherein the sealing arrangement comprises: a first sealing element disposed on the external wall of the plunger and spaced apart from an inner wall of the internal chamber; and a second sealing element disposed on the inner wall of the internal chamber and spaced apart from the external wall of the plunger. Preferably the second sealing element is mounted on the inner wall of the interior chamber.

Preferably the first sealing element is mounted and seals against the external wall of the plunger.

Preferably the second sealing element is disposed on the inner wall of the interior chamber so as to seal against the first sealing element when the liquid control valve is in the closed position.

Preferably, in a first mode, a portion of the plunger is configured to abut a lower surface of the second sealing element when the plunger is moved in use from the first position to the second position. In some embodiments, the portion of the plunger configured to abut a lower surface of the second sealing element comprises an edge of the groove.

Preferably the plunger abuts the lower surface of the second sealing element when the plunger is in an intermediate position between the first and second positions where the liquid control valve is partially opened such that the liquid can flow from the inlet to the outlet.

Preferably the second sealing element is configured to move along at least a length of the inner wall of the interior chamber when the plunger is further moved towards the second position.

Preferably the second sealing element seals against the plunger when the portion of plunger abuts the lower surface of the second sealing element.

Preferably second sealing element seals against the plunger when the liquid control valve is in the open position.

Preferably the second sealing element is configured to move along at least a length of the inner wall of the interior chamber when the plunger is further moved towards the first position.

Preferably the liquid control valve is configured to operate in the first mode when a pressure of the liquid supply is less than approximately 50 kPA, preferably in the range of 0 to 50 kPa.

Preferably, in a second mode, an upper surface of the second sealing element abuts a lower surface of the first sealing element when the plunger is moved from the first position to the second position and/or from the second position to the first position. In some embodiments, the second sealing element seals against the first sealing element under the action of a pressure exerted by the liquid supply.

Preferably, in the second mode, the liquid control valve is configured to operate in the second mode when a pressure of the liquid supply is more than approximately 50 kPa, preferably in the range of 50 to 1200 kPa.

Preferably the first sealing element comprises an O-ring type seal.

Preferably the second sealing element comprises a Quad ring type seal. In some embodiments, the second sealing element may comprise at least two lobes positioned on an outer surface facing the inner wall of the interior chamber. The second sealing element may comprise a side surface configured to seal against the first sealing element. The side surface may be angled relative to an outer surface and/or inner surface of the second sealing element. In other embodiments, the second sealing element may comprise two lobes positioned on an outer surface the inner wall of the interior chamber and two lobes positioned on an inner surface facing the external wall of the plunger. The second sealing element may comprise one or more protrusions disposed on the inner surface. In further embodiments, the second sealing element may comprise an O-ring type seal wherein an outer diameter of the second sealing element is greater than an outer diameter of the first sealing element.

Preferably the liquid control valve further comprises a lever arm configured to be pivotally coupled to the body, the lever arm being further configured to be coupled to a float at one end and to the plunger at another end such that the lever arm engages with the plunger to open and close the liquid control valve as a level of liquid in the reservoir lowers and rises respectively.

This invention may also be said broadly to consist in the parts, elements and features referred to or indicated in the specification of the application, individually or collectively, and any or all combinations of any two or more of said parts, elements and features, and where specific integers are mentioned herein which have known equivalents in the art to which this invention relates, such known equivalents are deemed to be incorporated herein as if individually set forth.

Other aspects of the invention may become apparent from the following description which is given by way of example only and with reference to the accompanying drawings.

BRIEF DESCRIPTION OF THE DRAWINGS

A number of embodiments of the present invention will now be described with reference to the accompanying drawings in which.

Further aspects of the invention will become apparent from the following description of the invention which is given by way of example only of particular embodiments.

BEST MODES FOR CARRYING OUT THE INVENTION

In the following description, numerous specific details are set forth in order to provide a thorough understanding of the various principles of the present invention. However, those skilled in the art will appreciate that not all these details are necessarily always required for practising the present invention.

Figure 1A:
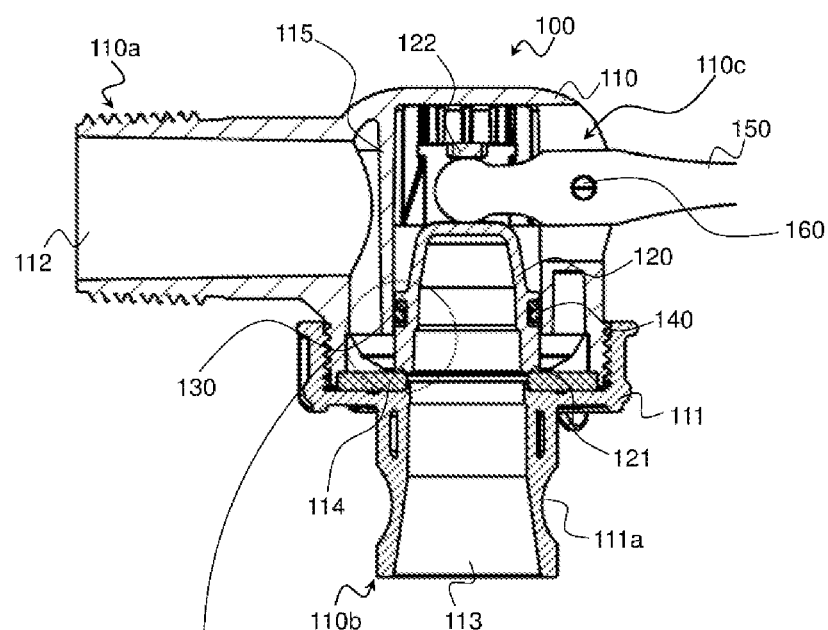
FIG. 1A is a cross-sectional view of a valve in a closed position, constructed and operative in accordance with an embodiment of the invention.

Reference is now made to FIG. 1A which is a cross-sectional view of a valve in a closed position, constructed and operative in accordance with an embodiment of the invention. FIG. 1 shows a valve 100 comprising a body 110, a valve mechanism plunger 120, a sealing arrangement comprising sealing elements 130, 140, and a lever arm 150 connected to a float (not shown). In use, the float arm or lever 150 engages with the plunger 120 operated valve mechanism to open and close the valve 100 as a level of liquid in a reservoir lowers and rises respectively.

The body 110 is of a generally cylindrical shape preferably moulded of a plastics material. The body 110 is configured to be coupled to a liquid source (not shown) at one end 110a via any suitable coupling means such as, for example but not limited to, threaded elements as depicted in FIG. 1A.

The body 110 is further configured to be coupled to a liquid dispensing device (e.g. a conduit—not shown) via a removable cap 111 at another end 110b. By being removable the cap 111 provides access to an interior chamber of the body 110 and, to that end, the removable cap 111 preferably includes an internal screw-thread at an inner end adapted to engage on an associated external screw-thread provided on an exterior surface of the body 110. Those skilled in the art will appreciate that this example is not limiting and that any suitable coupling means allowing the removable cap 111 and the body 110 to be separated may be used.

In addition, the removable cap 111 may also comprise coupling means by which the liquid dispensing device can be detachably coupled thereto. For example, the coupling means may be integrally incorporated into the removable cap 111 as a groove 111b disposed on an outer surface and adapted to receive an over-centre or fitting attached to the liquid dispensing device. It will be apparent to those skilled in the art that this example is not limiting and that any other coupling means suitable to couple the removable cap 111 and the liquid dispensing device may be used.

The body 110 comprises a bore 112 at the first end 110a forming an inlet port adapted to receive a supply of liquid and a second bore 113 extending through the removable cap 111 forming an outlet port at the second end 110b adapted to release the liquid. The outlet port may be formed centrally through the removable end cap 111 and an annular sealing element or washer 114 may be mounted within the removable end cap 111 to extend about the outlet port.

The valve 100 may further comprise a valve mechanism plunger 120 of a generally cylindrical section slidably mounted, and sealed such as by sealing elements 130, 140, within an associated cylinder section 115 formed in an interior chamber of the valve body 110. The plunger 120 may comprise a valve sealing rim 121 at a first end and a bridging section 122 at second end, opposite to the first end, configured to engage with the lever arm 150.

The lever arm 150 is connected at a first end to the float (not shown) and pivotally mounted such as by a pin 160 to the body 110 of the valve 100. The lever arm 150 is mounted through an opening 110c in the body 110 and a second end of the lever arm 150 engages with the bridging section 122 of the valve mechanism plunger 120. For example, the second end of the lever arm 150 locates in a laterally opening of the plunger 120. The opening may extend diametrically through the plunger 120 adjacent to the bridging section 122. The second end of the lever arm 150 impinges upwardly against the underside of the bridging section 122 to raise the plunger 120.

In use, lowering of the float due to the level of liquid in the reservoir lowering, causes the second end of the lever arm 150 to rise and lift the plunger 120 such that the valve sealing rim 121 is clear from the annular sealing element 114 and the valve is opened. Once the valve is opened, the liquid can flow from the liquid source to the liquid reservoir passing through the valve 100 (from the inlet port to the outlet port) and the liquid dispensing device. The valve 100 will close with the reverse action of the lever arm 150, the lever arm 150 displacing the plunger 120 downward for the valve sealing rim 121 to seat on the annular sealing element 114.

Figure 1B:
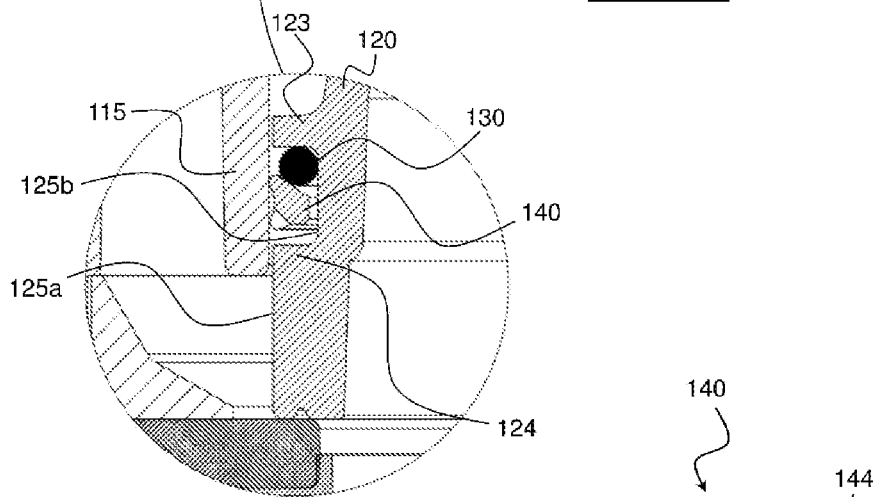
FIG. 1B is an enlarged cross-sectional view showing a sealing arrangement of the valve of FIG. 1A, constructed and operative in accordance with an embodiment of the present invention.

Reference is now made to FIG. 1B which is an enlarged cross-sectional view of the valve of FIG. 1A showing the sealing elements 130, 140 constructed and operative in accordance with an embodiment of the present invention.

As explained hereinabove in relation to FIG. 1A, the valve mechanism plunger 120 is of a generally cylindrical section and configured to be slidably mounted, and sealed such as by sealing elements 130, 140, within an associated cylinder section 115 formed in an interior chamber of the valve body 110. In a lower portion of the plunger 120, the outer diameter of the external wall 125*a* of the plunger 120 is smaller than the inner diameter of the cylinder section 115 of the body 110 so as to allow the plunger 120 to move reciprocally or freely slide within the cylinder section 115.

The sealing elements 130, 140 are mounted in an annular groove formed in the external wall and between two shoulders 123, 124 of the lower portion of the plunger 120. Within the groove, the external wall 125*b* of the plunger 120, also being the base of the groove, is of a substantially constant diameter. Further, the groove is dimensioned so that the outer diameter of the external wall 125*b* of the plunger 120 within the groove is smaller than the outer diameter of the external wall 125*a* of the plunger 120 in its lower portion. Similarly, the groove is dimensioned (e.g. the depth—distance between the outer diameters of the external walls 125*a* and 125*b*) and/or the sealing elements 130, 140 are selected so that they can be mounted within the groove without being compressed by the external wall 125*b* and/or the inner wall of the cylinder section 115. In addition, the groove is dimensioned so that the distance between the shoulders 123, 124 allows the sealing elements 130, 140 to move apart during operation of the valve 100 but prevents the sealing elements 130, 140 to be dislodged from the groove (e.g. enter the opening 110*c*) when the valve 100 is in the open position.

In some embodiments, the sealing element 130 is mounted onto the external wall 125*b* of the plunger 120 and spaced apart from the inner wall of the cylindrical section 115 of the valve body 110 such that when the plunger 120 is moved within the valve body 110 the sealing element 130 follows the movement of the plunger 120 without being compressed against the valve body 110, 115. The sealing element 140 is mounted onto the inner wall of the cylinder section 115 of the valve body 110 and spaced apart from the external wall 125*b* of the plunger 120 such that when the plunger 120 is moved within the valve body 110 the sealing element 140 is not compressed against the plunger 120, 125*b*. The sealing element 140 is further configured to be moved along at least a portion of the length of the inner wall of the cylindrical section 115 of the valve body 110 during operation of the valve 100.

For example, when the plunger 120 is moved upwards within the valve body 110, the shoulder 124 or the edge of the groove may abut a lower surface of the sealing element 140 such that further or prolonged upward movement of the plunger 120 causes the sealing element 140 to follow the movement of the plunger 120 and move relative to the valve body 110, 115. Similarly, when the plunger is moved downwards within the valve body 110, the sealing element 130, or a lower surface of the sealing element 130, may abut an upper surface of the sealing element 140 such that further or prolonged downward movement of the plunger 120 causes the sealing element 140 to follow the movement of the plunger 120 and move relative to the valve body 110, 115.

In some embodiments, an upper surface of the sealing element 140 may abut the sealing element 130 under the action of liquid pressure causing the sealing element 140 to follow the (upward or downward) movement of the plunger 120. Preferably, the sealing element 130 is an O-ring seal that is stretch-fit onto the plunger 120. For example, an inner diameter of the sealing element 130 is slightly smaller than an outer diameter of the external wall 125*b* of the plunger 120.

Preferably, the sealing element 140 is a Quad ring seal adapted to be mounted onto the inner wall of the cylinder section 115 of the valve body 110. For example, an outer diameter of the sealing element 140 is slightly greater than an inner diameter of cylinder 115 of the valve body 110.

Figure 1C:
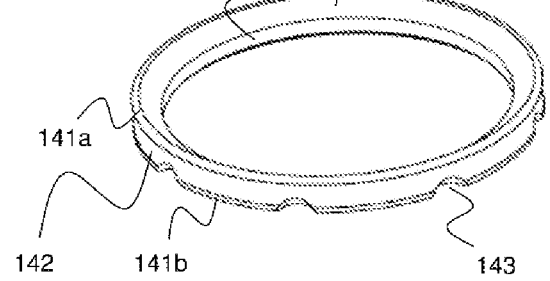
FIG. 1C is an isometric view of a sealing element of the valve of FIGS. 1A-1B.

FIG. 1C depicts the sealing element 140 (i.e. Quad ring) comprising two lobes 141*b*, 141*b* positioned on an outer surface 142 and configured to seal against the cylinder 115 of the valve body 110. The Quad ring may further comprise scallops or grooves 143, disposed on the lobe 141*b*, configured to prevent suction and therefore friction between the sealing element 140 and the cylinder 115 of the valve body 110. In addition, a side surface 144 positioned between the outer surface 142 and an inner surface 145 (i.e. surface facing the external wall 125*b* of the plunger 120) may be configured to improve the sealing efficiency between the sealing elements 130, 140. For example, the side surface 144 may be angled relative to the outer 142 or inner 145 surface so as to create a better seal with the sealing element 130.

Figure 1D:
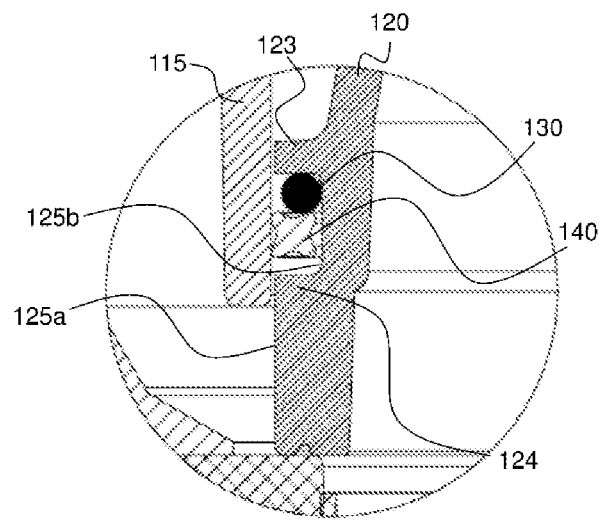
FIG. 1D is an enlarged cross-sectional view showing a sealing arrangement of the valve of FIG. 1A, constructed a operative in accordance with another embodiment of the present invention.
Figure 1E:
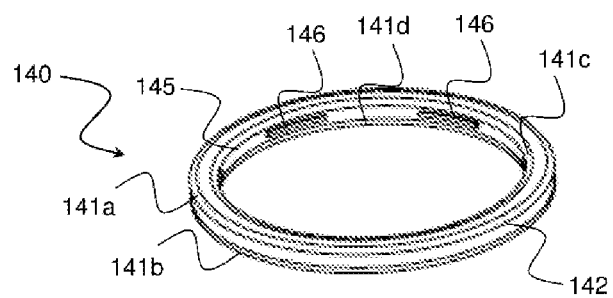
FIG. 1E is an isometric view of a sealing element of the valve of FIG. 1D.
Figure 1F:
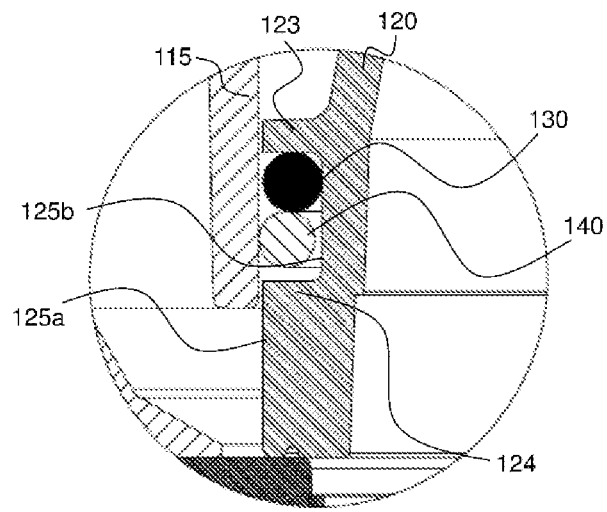
FIG. 1F is an enlarged cross-sectional view showing a sealing arrangement of the valve of FIG. 1A, constructed a operative in accordance with a further embodiment of the present invention.

Further examples of sealing arrangements constructed and operative in accordance with embodiments of the invention are illustrated on FIGS. 1D, 1E and 1F. The sealing arrangement of FIGS. 1D-1E is similar to the one of FIGS. 1B-1C. However, in FIGS. 1D-1E, the sealing element 140 is a Quad ring comprising four lobes, two lobes 141*b*, 141*b* being positioned on an outer surface 142 and two lobes 141*c*, 141*d* being positioned on an inner surface 145. In addition, the Quad ring may further comprise one or more protrusions 146, disposed on the inner surface 145 (i.e. the surface facing the external wall 125*b* of the plunger 120), configured to damp vibrations out of the plunger 120 and reduce the noise emitted by the valve 100 at certain liquid pressures.

In another embodiment illustrated on FIG. 1F, the sealing element 140 is an O-ring type seal that is mounted onto the inner wall of the cylinder section 115 of the valve body 110. The sealing elements 130, 140 may have the same or different cross sectional areas but the sealing element 140 has an outer diameter greater than an outer diameter of the sealing element 130.

In use, the sealing element 130 seals against the external wall 125*b* of the plunger and the sealing element 140 seals against the inner wall of the cylinder section 115 of the valve body 110. In addition, when the valve 100 is in the closed position (as illustrated in FIGS. 1A, 1B, 1D, and 1F), the sealing element 140 abuts against the sealing element 130 and seals against it, thereby completing the seal between valve body 110 (inner wall of the cylindrical section 115) and the plunger 120 (external wall 125*b*).

Figure 2:
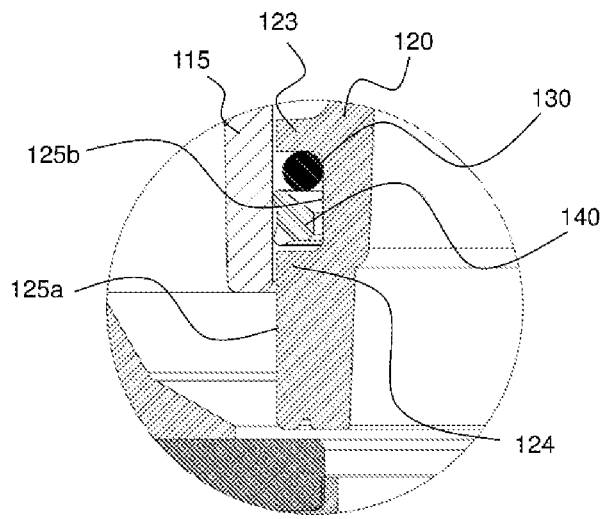
FIG. 2 is an enlarged cross-sectional view of the valve of FIGS. 1A-1B in a first intermediate position between an open and a closed position.
Figure 3:
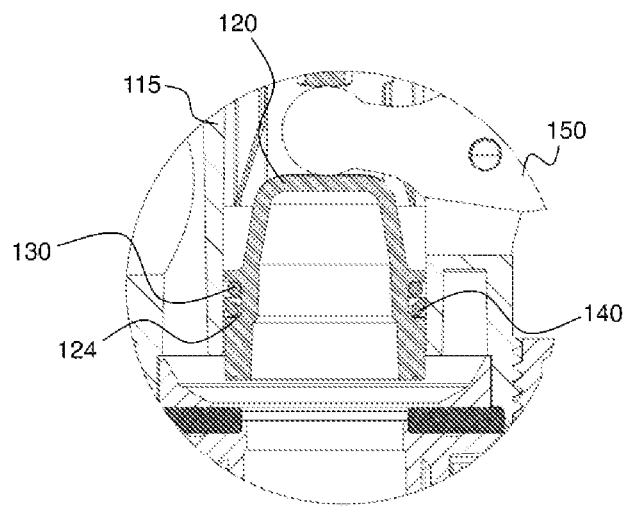
FIG. 3 is an enlarged cross-sectional view of the valve of FIGS. 1A-1B and 2 in a second intermediate position between an open and a closed position.
Figure 4:
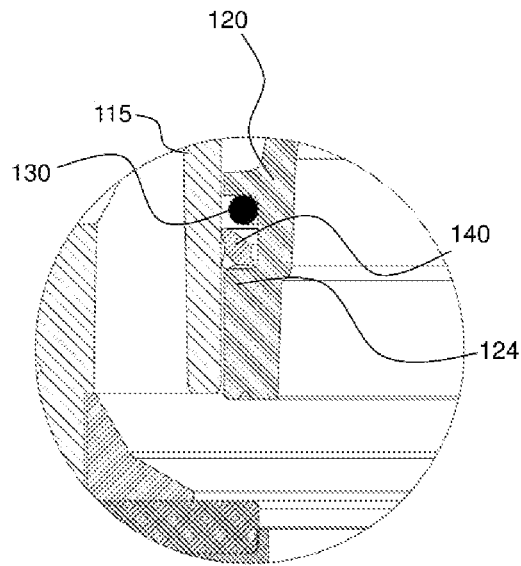
FIG. 4 is an enlarged cross-sectional view of the valve of FIGS. 1A-1B, 2, and 3 in an open position.

Reference will now be made to FIGS. 2 to 4 which are static illustrations showing the different elements of the valve 100 when the valve 100 is moved from a closed (FIGS. 1A-1B, 1D, and 1F) to an open position (FIG. 4).

FIG. 2 illustrates a first intermediate position where the seal between the sealing elements 130 and 140 starts to open due to the plunger 120 being lifted by the lever arm 150 (i.e. the valve 100 being partially opened). In this configuration, the sealing element 140 remains in its initial position (closed valve) and there is no friction between the sealing elements 130, 140 as the sealing element 130 is lifted clear of the sealing element 140.

FIG. 3 illustrates a second intermediate position where the plunger 120 is moved further upwards by the lever arm 150.

At this stage, the sealing element 140, still in its initial position (closed valve), contacts the shoulder 123 or the edge of the groove of the plunger 120 thereby forming a seal between the valve body 110 and the plunger 120. As the plunger 120 continues its upward motion, the shoulder 124 or the edge of the groove pulls the sealing element 140 upwards until the valve 100 is fully opened. In other words, the sealing element 140 is moved upwards along the inner wall of the cylindrical section 115 of the valve body 110 until the valve 100 is fully opened.

FIG. 4 illustrates the valve 100 in the open position. When the valve 100 reaches its open position, the liquid can flow from the liquid source to the liquid reservoir passing through the valve 100 (from the inlet port to the outlet port) and the liquid dispensing device.

Figure 5:
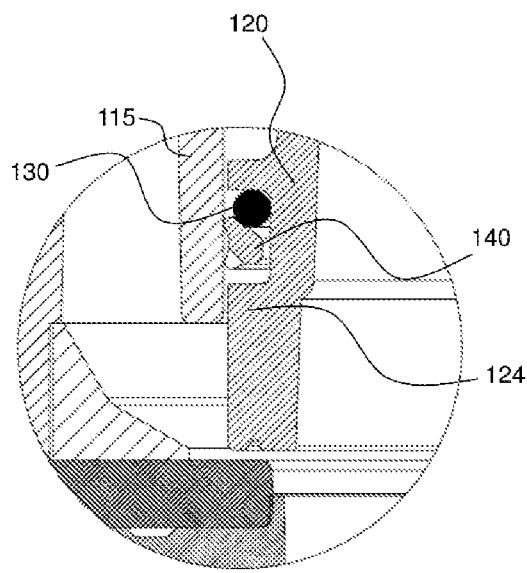
FIG. 5 is an enlarged cross-sectional view of the valve of FIGS. 1A-1B, 2, 3, and 4 in a third intermediate position between an open and a closed position.

Reference is now made to FIG. 5 is an enlarged cross-sectional view of the valve 100 when the valve 100 is moved from the open (FIG. 4) to the closed position (FIGS. 1A-1B, 1D, and 1F).

FIG. 5 shows a third intermediate position where the plunger 120 is moved downwards by the lever arm 150. In this situation, the sealing element 140 initially remains in its final position (i.e. position reached when the valve is fully opened) and does not move relative to the cylindrical section 115 of the valve body 110. As the plunger 120 continues its downward motion, the sealing element 130 contacts the sealing element 140 thereby forming a seal between the valve body 110 and the plunger 120. When the plunger 120 is further moved downwards, the sealing element 130 and the shoulder 123 of the plunger 120 pushes the sealing element 140 downwards until the valve 100 is fully closed.

In other words, the sealing element 140 is moved downwards along at least a length of the inner wall of the cylindrical section 115 of the valve body 110, while maintaining the seal between the valve body 110 and the plunger 120, until the valve 100 is fully closed. When the cycle is complete and the valve 100 reaches its closed position (FIGS. 1A-1B, 1D, and 1F), the sealing elements 130, 140 form the seal between the valve body 110 and the plunger 120.

FIGS. 1A to 5 illustrate embodiments of the invention where the valve 100 operates under certain working parameters such as a low pressure of liquid supply, for example at a liquid pressure less than approximately 50 kPa, preferably between 0 and 50 kPa. However, in some embodiments, the valve 100 may also be configured to operate under high pressure of liquid supply, for example at a liquid pressure more than approximately 50 kPa, preferably between 50 and 1200 kPa. Under such conditions, the liquid pressure exerts a force under the lower surface of the sealing element 140 causing the sealing element 140 to remain in contact with the sealing element 130 during the (upward and downward) movement of the plunger 120. In other words, the high liquid pressure forces the sealing element 140 to remain in contact with the sealing element 130 such that the shoulder 124 or the edge of the groove does not abut the lower surface of the sealing element 140 and the sealing element 140 follows the movement of the plunger 120 and moves relative to the valve body 110, 115 i.e. along at least a portion of the length of the valve body 110, 115. Such configuration is depicted in FIGS. 1A-1B, 1D, and 1F for the valve 100 in a closed position and in FIG. 5 for the valve 100 being partially opened.

Unless the context clearly requires otherwise, throughout the description, the words "comprise", "comprising", and the like, are to be construed in an inclusive sense as opposed to an exclusive or exhaustive sense, that is to say, in the sense of "including, but not limited to".

Although this invention has been described by way of example and with reference to possible embodiments thereof, it is to be understood that modifications or improvements may be made thereto without departing from the scope of the invention. The invention may also be said broadly to consist in the parts, elements and features referred to or indicated in the specification of the application, individually or collectively, in any or all combinations of two or more of said parts, elements or features. Furthermore, where reference has been made to specific components or integers of the invention having known equivalents, then such equivalents are herein incorporated as if individually set forth.

Any discussion of the prior art throughout the specification should in no way be considered as an admission that such prior art is widely known or forms part of common general knowledge in the field

What we claim is:

1. A liquid control valve for use in controlling a liquid supply to a reservoir comprising:
    a body comprising an inlet port, an outlet port, and an interior chamber, the body defining a liquid passageway between the inlet and outlet ports;
    a plunger comprising a groove provided on an external wall, the plunger being configured to reciprocally move, in use, within the interior chamber of the body between a first position where the liquid control valve is closed such that the liquid is prevented to flow from the inlet to the outlet port and a second position where the liquid control valve is open such that the liquid can flow from the inlet to the outlet; and
    a sealing arrangement disposed within the groove configured to seal between the plunger and the interior chamber of the body;
    wherein the sealing arrangement comprises:
        a first sealing element mounted and sealed on the external wall of the plunger and spaced apart from an inner wall of the interior chamber; and
        a second sealing element mounted on the inner wall of the interior chamber and spaced apart from the external wall of the plunger so as to seal against the first sealing element when the liquid control valve is in the closed position,
    wherein both the first and second sealing elements are movable relative to the groove defined by the plunger in the same directions as the reciprocal motion of the plunger,
        wherein, in a mode of operation, an upper surface of the second sealing element abuts a lower surface of the first sealing element when the plunger is moved from the first position to the second position and/or from the second position to the first position and when a pressure of the liquid supply is more than 50 kPa.

2. A liquid control valve for use in controlling a liquid supply to a reservoir comprising:
    a body comprising an inlet port, an outlet port, and an interior chamber, the body defining a liquid passageway between the inlet and outlet ports;
    a plunger comprising a groove provided on an external wall, the plunger being configured to reciprocally move, in use, within the interior chamber of the body between a first position where the liquid control valve is closed such that the liquid is prevented to flow from the inlet to the outlet port and a second position where the liquid control valve is open such that the liquid can flow from the inlet to the outlet; and a sealing arrangement disposed within the groove configured to seal between the plunger and the interior chamber of the body;
wherein the sealing arrangement comprises:
a first sealing element mounted and sealed on the external wall of the plunger and spaced apart from an inner wall of the interior chamber; and
a second sealing element mounted on the inner wall of the interior chamber and spaced apart from the external wall of the plunger so as to seal against the first sealing element when the liquid control valve is in the closed position,
wherein both the first and second sealing elements are movable relative to the groove defined by the plunger in the same directions as the reciprocal motion of the plunger,
the second sealing element being a Quad ring.

3. The liquid control valve of claim 2, wherein the second sealing element comprises at least two lobes positioned on an outer surface facing the inner wall of the interior chamber.

4. The liquid control valve of claim 2, wherein the second sealing element comprises a side surface configured to seal against the first sealing element.

5. The liquid control valve of claim 4, wherein the side surface is angled relative to an outer surface and/or inner surface of the second sealing element.

6. A liquid control valve for use in controlling a liquid supply to a reservoir comprising:
a body comprising an inlet port, an outlet port, and an interior chamber, the body defining a liquid passageway between the inlet and outlet ports;
a plunger comprising a groove provided on an external wall, the plunger being configured to reciprocally move, in use, within the interior chamber of the body between a first position where the liquid control valve is closed such that the liquid is prevented to flow from the inlet to the outlet port and a second position where the liquid control valve is open such that the liquid can flow from the inlet to the outlet; and
a sealing arrangement disposed within the groove configured to seal between the plunger and the interior chamber of the body;
wherein the sealing arrangement comprises:
a first sealing element mounted and sealed on the external wall of the plunger and spaced apart from an inner wall of the interior chamber; and
a second sealing element mounted on the inner wall of the interior chamber and spaced apart from the external wall of the plunger so as to seal against the first sealing element when the liquid control valve is in the closed position,
wherein both the first and second sealing elements are movable relative to the groove defined by the plunger in the same directions as the reciprocal motion of the plunger,
wherein, in a mode of operation, a portion of the plunger is configured to abut a lower surface of the second sealing element when the plunger is moved in use from the first position to the second position and when a pressure of the liquid supply is in the range of 0 to 50 kPa.

7. The liquid control valve of claim 6, wherein the portion of the plunger comprises an edge of the groove.

8. The liquid control valve of claim 6, wherein the plunger abuts the lower surface of the second sealing element when the plunger is in an intermediate position between the first and second positions where the liquid control valve is partially opened such that the liquid can flow from the inlet to the outlet.

9. The liquid control valve of claim 6, wherein the second sealing element is configured to move along at least a length of the inner wall of the interior chamber when the plunger is further moved towards the second position.

10. The liquid control valve of claim 6, wherein the second sealing element seals against the plunger when the portion of the plunger abuts the lower surface of the second sealing element.

11. The liquid control valve of claim 6, wherein the second sealing element seals against the plunger when the liquid control valve is in the open position.

12. The liquid control valve of claim 6, wherein the second sealing element is configured to move along at least a length of the inner wall of the interior chamber when the plunger is further moved towards the first position.

13. The liquid control valve of claim 6, wherein the first sealing element comprises an O-ring.

14. The liquid control valve of claim 6, wherein the second sealing element comprises an O-ring seal.

15. The liquid control valve of claim 6, further comprising a lever arm configured to be pivotally coupled to the body, the lever arm being further configured to be coupled to a float at one end and to the plunger at another end such that the lever arm engages with the plunger to open and close the liquid control valve as a level of liquid in the reservoir lowers and rises respectively.

* * * * *